US012602451B2

(12) United States Patent
Cleere et al.

(10) Patent No.: US 12,602,451 B2
(45) Date of Patent: Apr. 14, 2026

(54) UNSUPERVISED ANOMALY DETECTION MACHINE LEARNING FRAMEWORKS

(71) Applicant: Optum Services (Ireland) Limited, Dublin (IE)

(72) Inventors: David T. Cleere, Dublin (IE); Ian Crawford, Donegal (IE)

(73) Assignee: Optum Services (Ireland) Limited, Dublin (IE)

( * ) Notice: Subject to any disclaimer, the term of this patent is extended or adjusted under 35 U.S.C. 154(b) by 1090 days.

(21) Appl. No.: 17/579,335

(22) Filed: Jan. 19, 2022

(65) Prior Publication Data

US 2023/0229738 A1     Jul. 20, 2023

(51) Int. Cl.
*G06N 20/20*      (2019.01)
*G06F 18/23*      (2023.01)

(52) U.S. Cl.
CPC ............. *G06F 18/23* (2023.01); *G06N 20/20* (2019.01)

(58) Field of Classification Search
CPC ......... G06F 18/23; G06N 20/20; G06N 20/00
See application file for complete search history.

(56) References Cited

U.S. PATENT DOCUMENTS

| | | |
|---|---|---|
| 6,826,536 B1 | 11/2004 | Forman |
| 7,873,528 B2 | 1/2011 | Bregante et al. |
| 10,002,391 B1 | 6/2018 | Kusens |
| 10,546,098 B2 | 1/2020 | Derer |
| 10,546,099 B2 | 1/2020 | Adjaoute |
| 11,080,793 B2 | 8/2021 | Adjaoute |
| 2008/0097820 A1* | 4/2008 | Koran ................ G06Q 30/0201 |
| | | 705/7.29 |
| 2013/0006655 A1 | 1/2013 | Van Arkel et al. |
| 2015/0127370 A1 | 5/2015 | Cornelis |
| 2018/0239870 A1 | 8/2018 | Goldman et al. |

(Continued)

OTHER PUBLICATIONS

Liu, Fei Tony et al. "Isolation-Based Anomaly Detection," ACM Transactions on Knowledge Discovery From Data, vol. 6, Issue 1, Mar. 2012, Article No. 3, pp. 1-39, available online at https://dl.acm.org/doi.1145/2133360.2133363.

(Continued)

*Primary Examiner* — Lut Wong
(74) *Attorney, Agent, or Firm* — Alston & Bird LLP

(57) ABSTRACT

Various embodiments of the present invention provide methods, apparatus, systems, computing devices, computing entities, and/or the like for performing anomaly detection operations. Certain embodiments of the present invention utilize systems, methods, and computer program products that perform anomaly detection operations by using a three-tiered unsupervised anomaly detection machine learning framework to perform high-volume anomaly detection and via utilizing a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

20 Claims, 7 Drawing Sheets

(56)                    References Cited

U.S. PATENT DOCUMENTS

2020/0285997  A1*   9/2020   Bhattacharyya ......... G06N 7/01
2021/0174944  A1    6/2021   Patel et al.

OTHER PUBLICATIONS

Reynolds, Frederick Jonathan. "Using Symbolic Data Analysis to Detect Fraud, Waste, and Abuse in Healthcare Insurance Claims Data," Dissertation to the Graduate Faculty of Auburn University, May 2, 2020, (187 pages), Auburn, Alabama.
Shih, Ya-Chen Tina et al. "Use of Claims Data for Cost and Cost-Effectiveness Research," Seminars In Radiation Oncology, vol. 29, No. 4, Oct. 2019, pp. 348-353, DOI: 10.1016/j.semradonc. 2019.15.009, (Author Manuscript, HHS Public Access, Oct. 1, 2020, [11 pages]).

* cited by examiner

UNSUPERVISED ANOMALY DETECTION MACHINE LEARNING FRAMEWORKS

BACKGROUND

Various embodiments of the present invention address technical challenges related to performing predictive data analysis. Various embodiments of the present invention address the shortcomings of existing anomaly detection systems and disclose various techniques for efficiently and reliably performing anomaly detection operations.

BRIEF SUMMARY

In general, embodiments of the present invention provide methods, apparatus, systems, computing devices, computing entities, and/or the like for performing anomaly detection operations. Certain embodiments of the present invention utilize systems, methods, and computer program products that perform anomaly detection operations by using a three-tiered unsupervised anomaly detection machine learning framework to perform high-volume anomaly detection and via utilizing a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

In accordance with one aspect, a method is provided. In one embodiment, the method comprises: for each predictive input of a plurality of predictive inputs, determining, using one or more processors and based at least in part on the predictive input and using a randomized partitioning anomaly detection machine learning model of an unsupervised anomaly detection machine learning framework, a randomized partitioning anomaly detection label; for each predictive input that is associated with an affirmative randomized partitioning anomaly detection label, determining, using the one or more processors and based at least in part on the predictive input and using a rule-based partitioning anomaly detection model of the unsupervised anomaly detection machine learning framework, a rule-based partitioning anomaly detection label; identifying, using the one or more processors, one or more filtered predictive inputs by filtering the plurality of predictive inputs to exclude predictive inputs that are not associated with an affirmative rule-based partitioning anomaly detection label; determining, using the one or more processors and based at least in part on the one or more filtered predictive inputs and using a clustering machine learning model of the unsupervised anomaly detection machine learning framework, one or more input clusters; for each input cluster, determining, using the one or more processors, a per-cluster anomaly designation based at least in part on ground-truth anomaly detection labels for n highest utility filtered predictive inputs in the input cluster; for each filtered predictive input, in response to determining that the per-cluster anomaly designation for the input cluster that comprises the filtered predictive input is an affirmative per-cluster anomaly designation, determining, using the one or more processors, the anomaly detection label for the filtered predictive input based at least in part on a cluster distribution ratio of: (i) an input utility measure for the filtered predictive input, and (ii) a cluster utility measure for the n highest utility filtered predictive inputs in the input cluster that comprises the filtered predictive input; performing, using the one or more processors, one or more prediction-based actions based at least in part on the anomaly detection labels.

In accordance with another aspect, a computer program product is provided. The computer program product may comprise at least one computer-readable storage medium having computer-readable program code portions stored therein, the computer-readable program code portions comprising executable portions configured to: for each predictive input of a plurality of predictive inputs, determine, based at least in part on the predictive input and using a randomized partitioning anomaly detection machine learning model of the unsupervised anomaly detection machine learning framework, a randomized partitioning anomaly detection label; for each predictive input that is associated with an affirmative randomized partitioning anomaly detection label, determine, based at least in part on the predictive input and using a rule-based partitioning anomaly detection model of the unsupervised anomaly detection machine learning framework, a rule-based partitioning anomaly detection label; identify one or more filtered predictive inputs by filtering the plurality of predictive inputs to exclude predictive inputs that are not associated with an affirmative rule-based partitioning anomaly detection label; determine, based at least in part on the one or more filtered predictive inputs and using a clustering machine learning model of the unsupervised anomaly detection machine learning framework, one or more input clusters; for each input cluster, determine a per-cluster anomaly designation based at least in part on ground-truth anomaly detection labels for n highest utility filtered predictive inputs in the input cluster; for each filtered predictive input, in response to determining that the per-cluster anomaly designation for the input cluster that comprises the filtered predictive input is an affirmative per-cluster anomaly designation, determine the anomaly detection label for the filtered predictive input based at least in part on a cluster distribution ratio of: (i) an input utility measure for the filtered predictive input, and (ii) a cluster utility measure for the n highest utility filtered predictive inputs in the input cluster that comprises the filtered predictive input; and perform one or more prediction-based actions based at least in part on the anomaly detection labels.

In accordance with yet another aspect, an apparatus comprising at least one processor and at least one memory including computer program code is provided. In one embodiment, the at least one memory and the computer program code may be configured to, with the processor, cause the apparatus to: for each predictive input of a plurality of predictive inputs, determine, based at least in part on the predictive input and using a randomized partitioning anomaly detection machine learning model of the unsupervised anomaly detection machine learning framework, a randomized partitioning anomaly detection label; for each predictive input that is associated with an affirmative randomized partitioning anomaly detection label, determine, based at least in part on the predictive input and using a rule-based partitioning anomaly detection model of the unsupervised anomaly detection machine learning framework, a rule-based partitioning anomaly detection label; identify one or more filtered predictive inputs by filtering the plurality of predictive inputs to exclude predictive inputs that are not associated with an affirmative rule-based partitioning anomaly detection label; determine, based at least in part on the one or more filtered predictive inputs and using a clustering machine learning model of the unsupervised anomaly detection machine learning framework, one or more input clusters; for each input cluster, determine a per-cluster anomaly designation based at least in part on ground-truth anomaly detection labels for n highest utility filtered predictive inputs in the input cluster; for each filtered predictive input, in response to determining that the per-cluster anomaly designation for the input cluster that comprises the filtered predictive input is an affirmative per-cluster anomaly designation, determine the anomaly detection label for the filtered predictive input based at least in part on a cluster distribution ratio of: (i) an input utility measure for the filtered predictive input, and (ii) a cluster utility measure for the n highest utility filtered predictive inputs in the input cluster that comprises the filtered predictive input; and perform one or more prediction-based actions based at least in part on the anomaly detection labels.

BRIEF DESCRIPTION OF THE DRAWINGS

Figure 1:
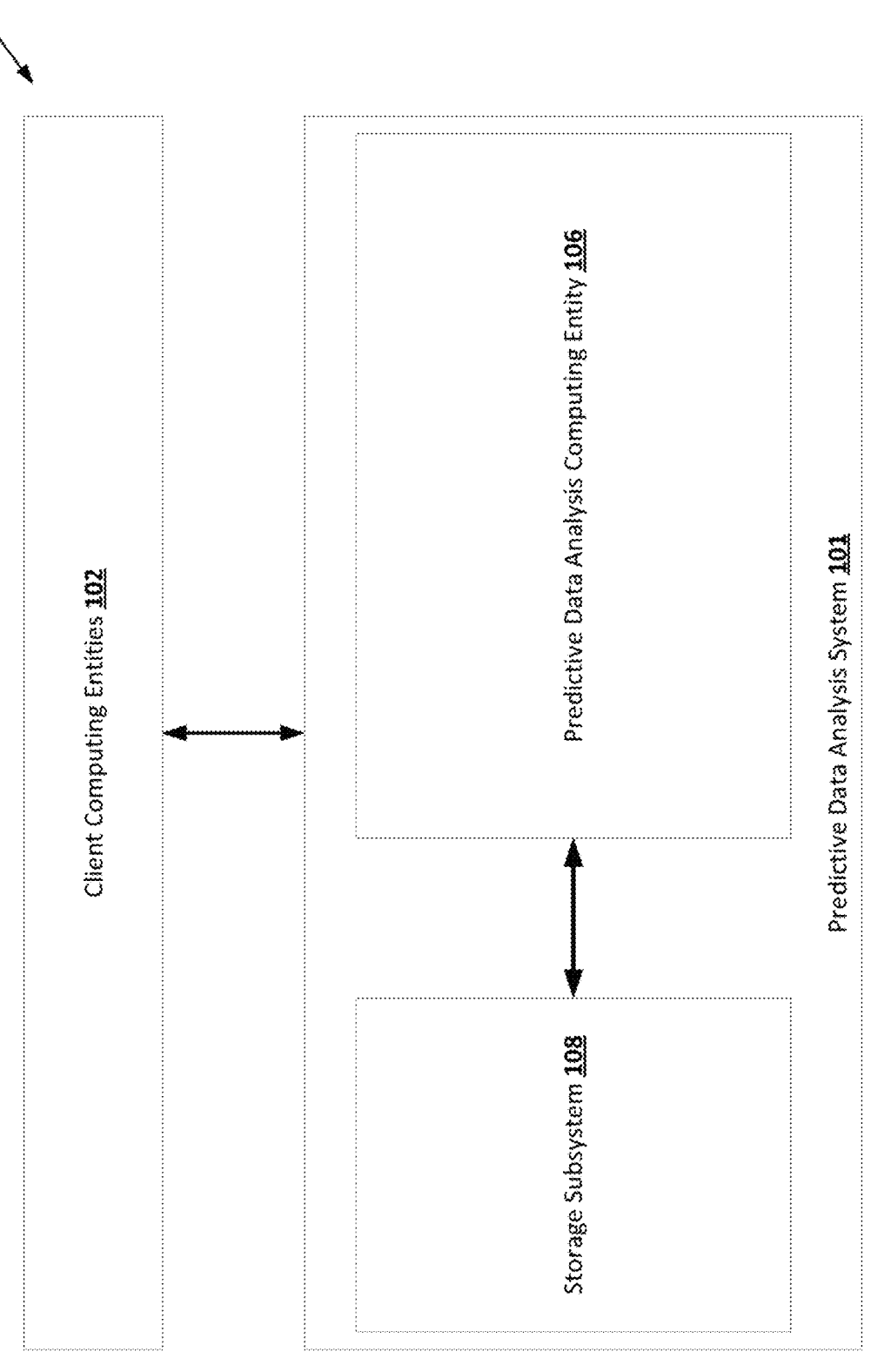

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
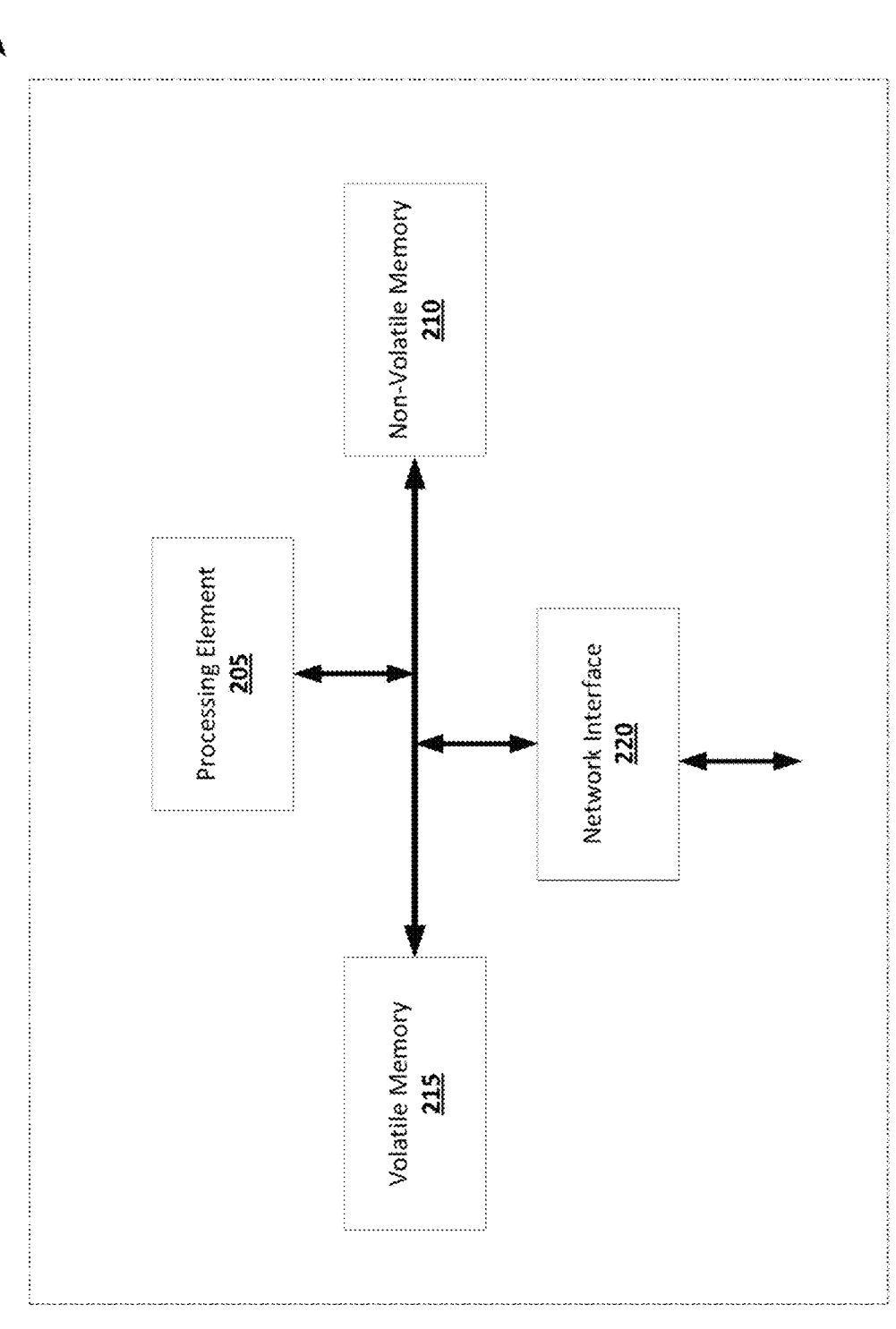

FIG. 2 provides an example predictive data analysis computing entity in accordance with some embodiments discussed herein.

Figure 3:
Figure 3:
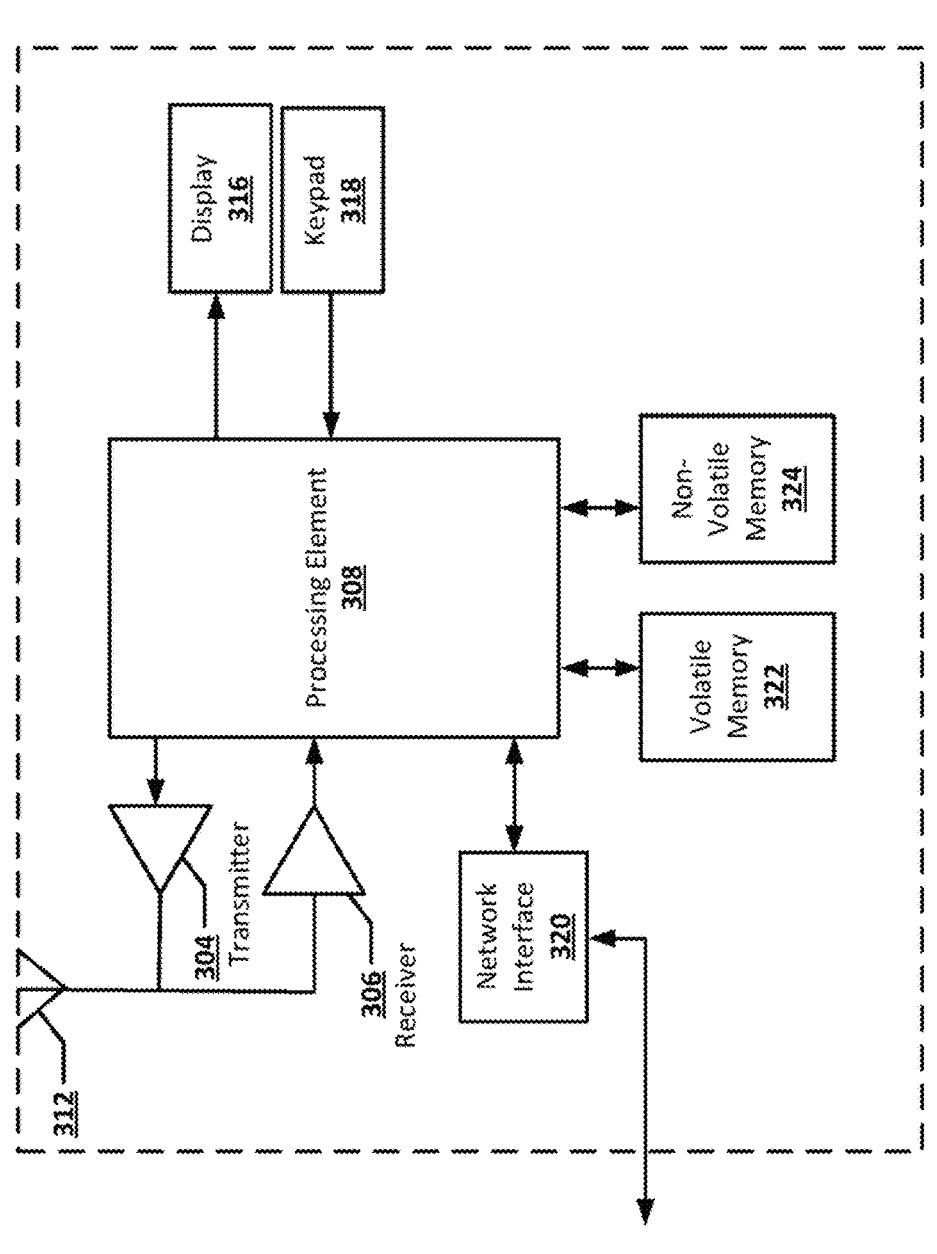

FIG. 3 provides an example external computing entity in accordance with some embodiments discussed herein.

Figure 4:
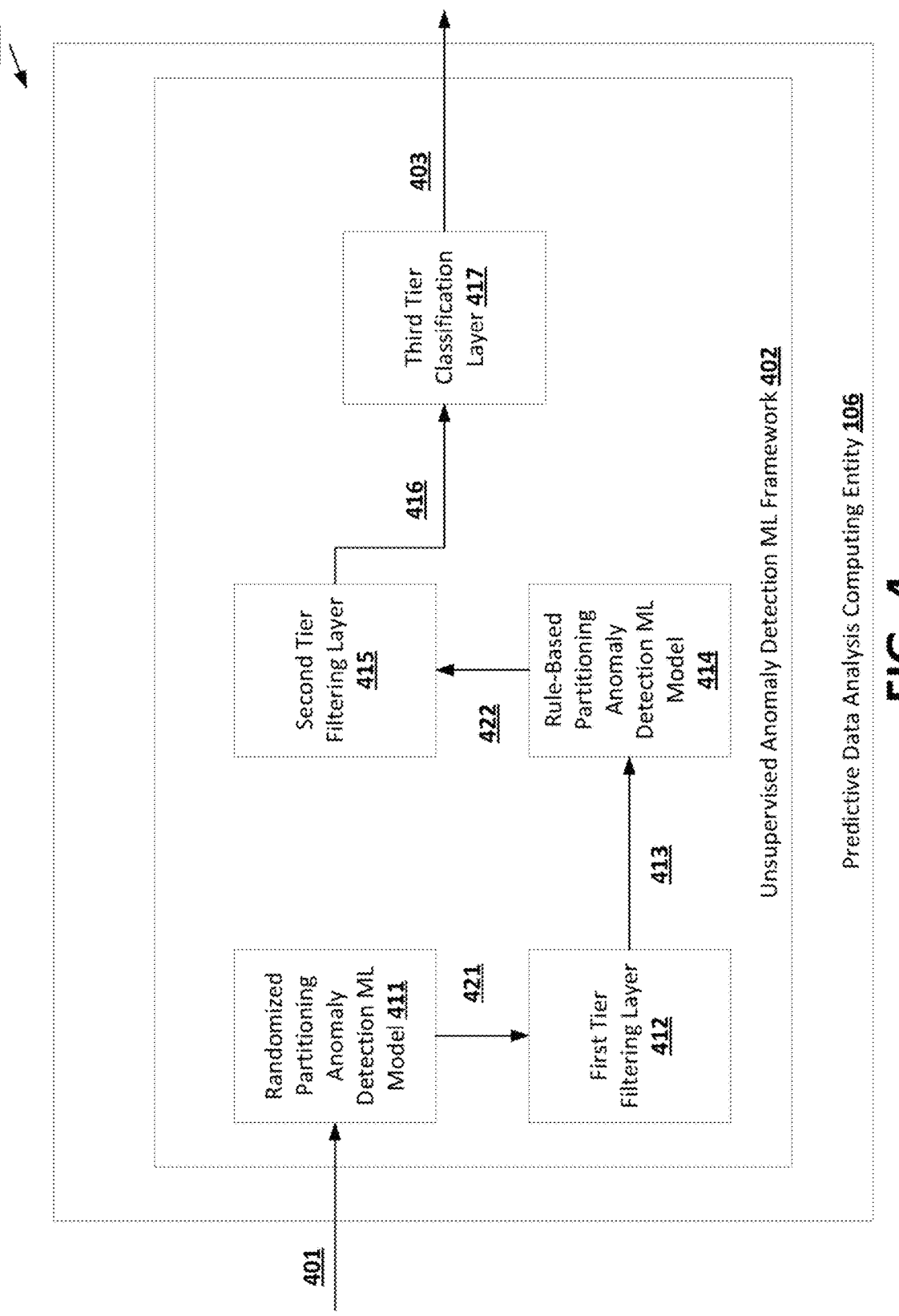

FIG. 4 is a data flow diagram of an example process for unsupervised anomaly detection in accordance with some embodiments discussed herein.

Figure 5:
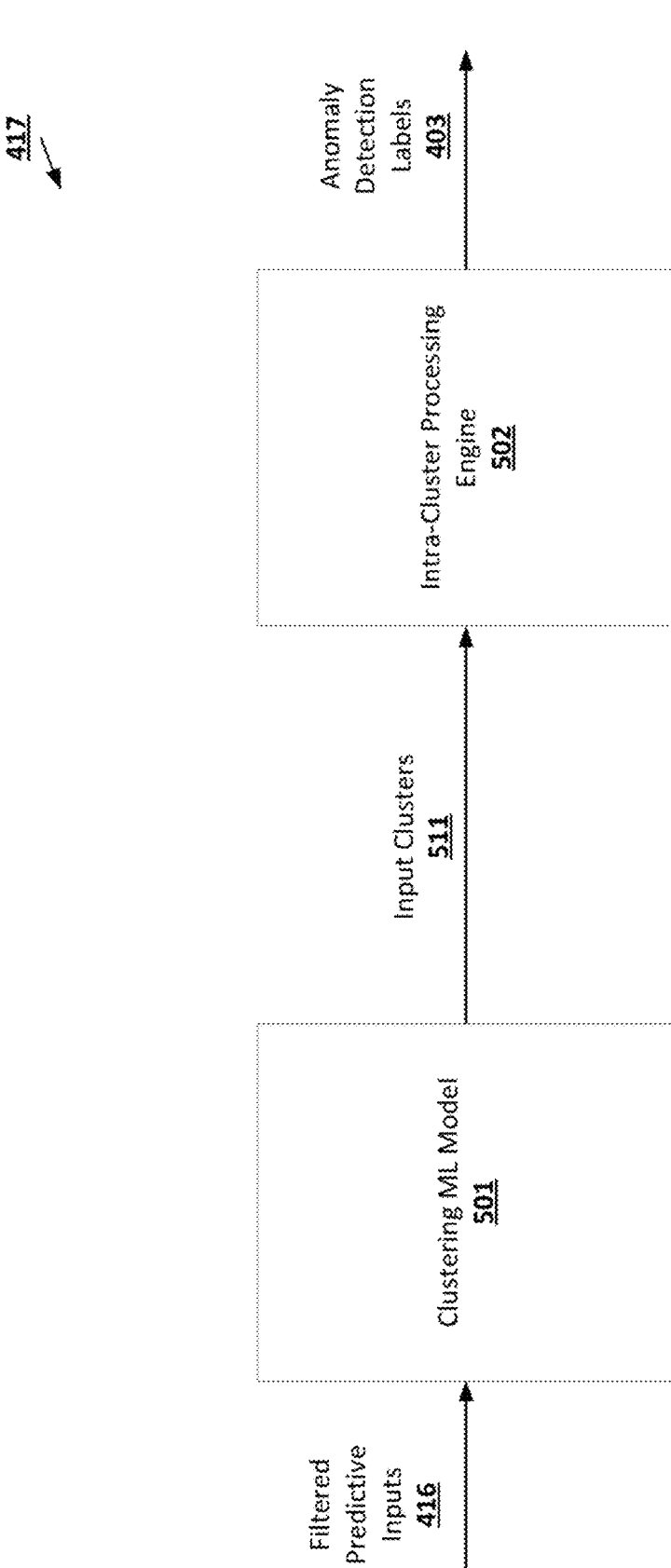

FIG. 5 provides an operational example of an exemplary architecture for a third tier classification layer of an unsupervised anomaly detection machine learning framework in accordance with some embodiments discussed herein.

Figure 6:
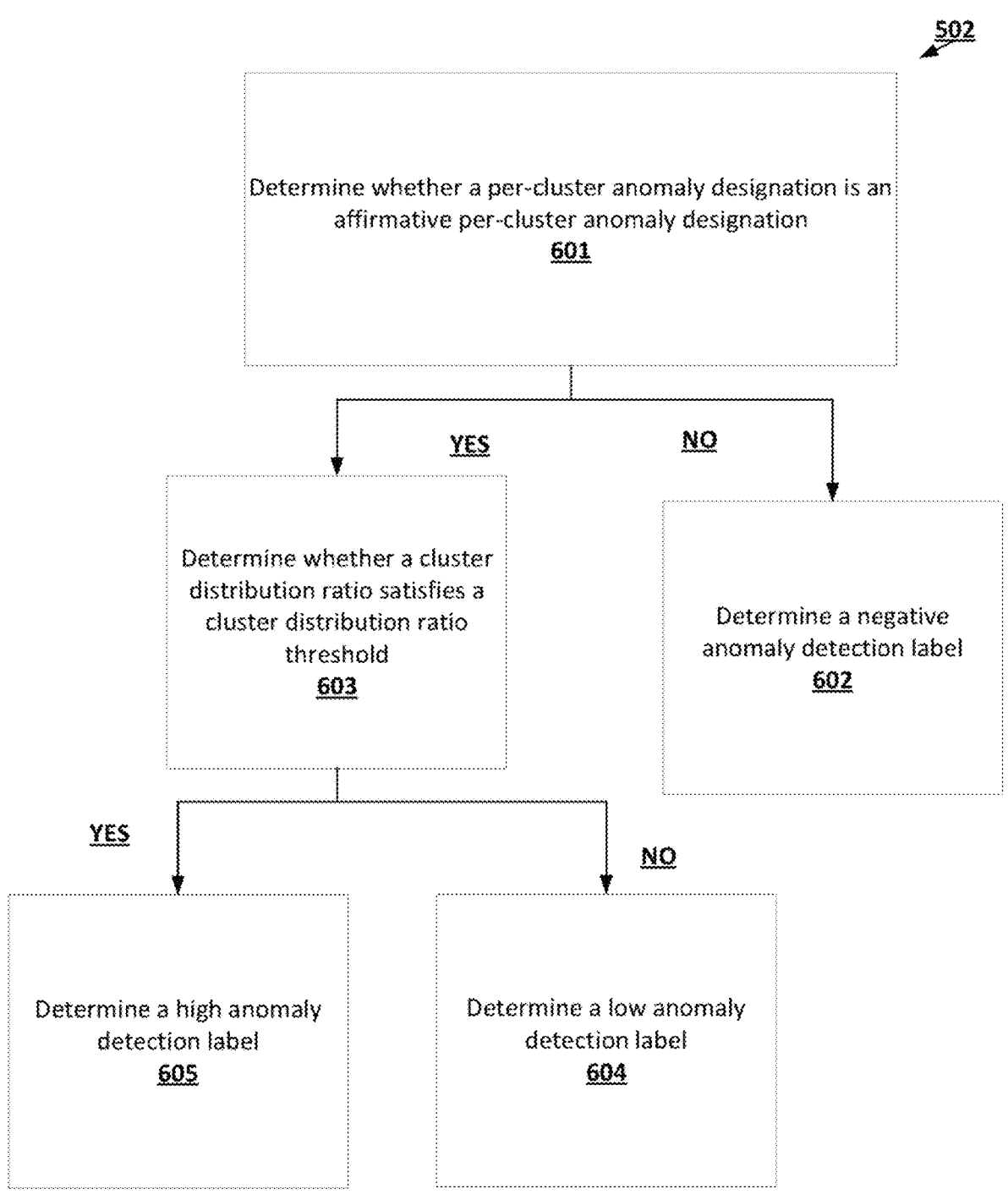

FIG. 6 is a flowchart diagram of an example process for determining the anomaly detection label for a particular filtered predictive input using an intra-cluster processing engine of a third tier classification layer of an unsupervised anomaly detection machine learning framework in accordance with some embodiments discussed herein.

Figure 7:
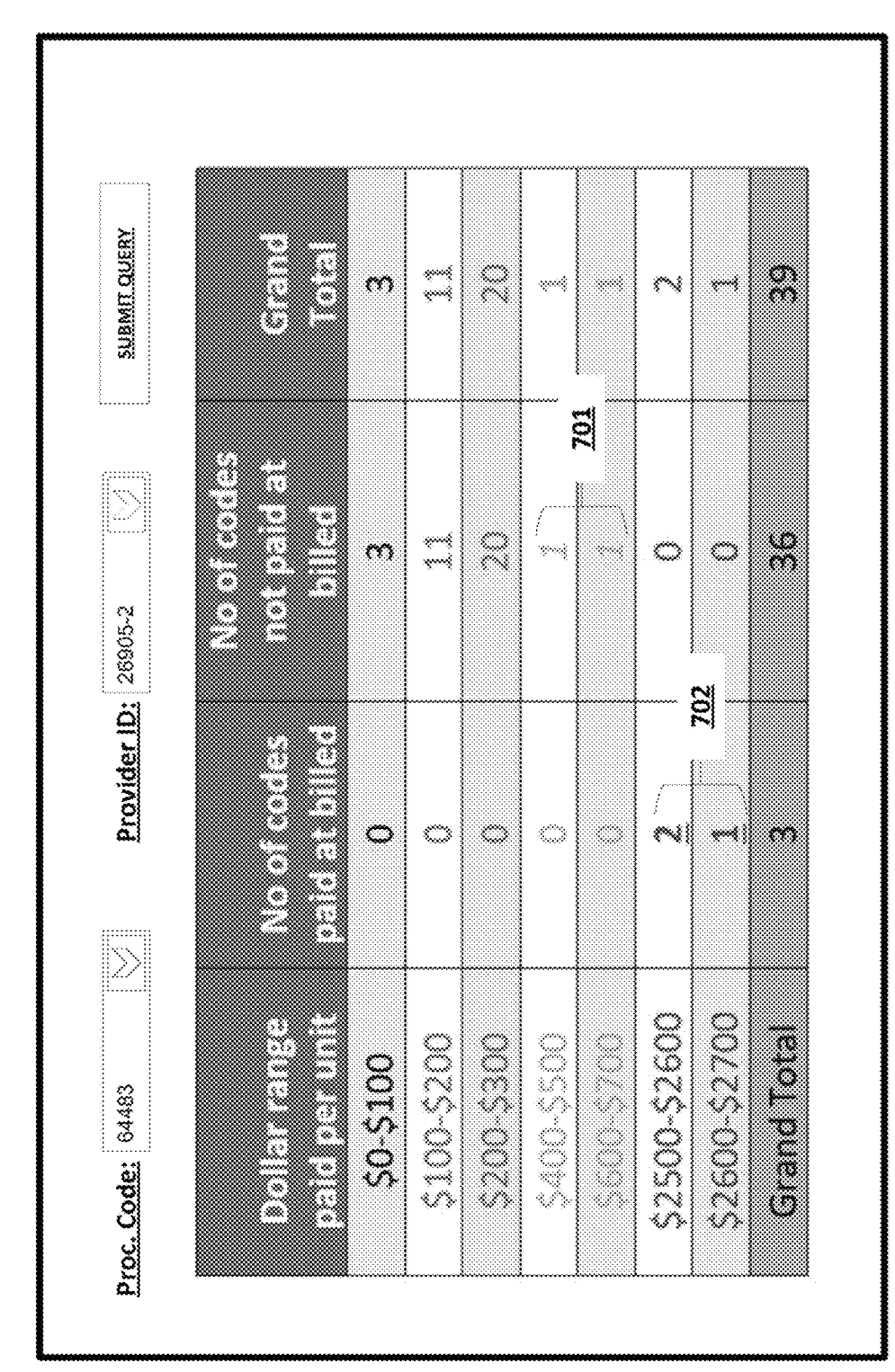

FIG. 7 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention address technical challenges associated with computational complexity of performing anomaly detection on a large number of predictive inputs by using a three-tiered unsupervised anomaly detection machine learning framework to perform high-volume anomaly detection by using a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

In some embodiments, by using randomized partitions of a multi-dimensional space containing mappings of all of a group of predictive inputs to generate anomaly scores/labels, the randomized partitioning anomaly detection machine learning model is an ideal first tier layer for performing anomaly detection using unsupervised machine learning techniques. One reason for this inventive insight is that randomized partitions across a set of mappings can be performed on feature type level, rather than the individual feature value level, which avoids the need for performing complex operations on individual feature values of individual predictive inputs. For example, in some embodiments, the randomized partitioning anomaly detection machine learning model can generate an isolation forest data object for each predictive input by repeatedly selecting a predictive input feature type from the set of predictive input feature types for the group of predictive inputs and partitioning the range of the selected predictive input feature type into a set of sub-ranges associated with branches of a tree data object, where this repeated process is performed for the tree data object until each leaf node of the resulting tree data object is associated with only one predictive input (i.e., until each predictive input is isolated). The isolation forest data object may itself include one or more of these resulting tree data objects. Once generated, based at least in part on the assumption that more anomalous predictive inputs will be isolated faster, the distance between the tree nodes associated with the predictive input in the isolation forest data object and the root nodes of the isolation forest data object may be used as an inverse proxy for the anomalous scores of the predictive inputs. In this way, anomaly detection inferences can be generated by partitioning predictive inputs on an aggregate, feature-based level, while only performing computationally linear operations on individual feature values each predictive input.

In some embodiments, by using rule-based determinations based at least in part on target ranges for ranged predictive input features, the rule-based partitioning anomaly detection model is an ideal second tier layer for performing anomaly detection using unsupervised machine learning techniques. One reason for this inventive insight is that, because rule-based operations can be performed with linear computational complexity with respect to the predictive inputs that have already survived the first-tier filtering, the need for performing complex per-input operations is avoided and even linear per-input operations are performed only on a subset of input data that have survived the first-tier filtering that is performed based at least in part on the predictions generated by the randomized partitioning anomaly detection machine learning model.

In some embodiments, using the third tier of the unsupervised anomaly detection machine learning framework that uses a clustering machine learning model and intra-cluster inferences performed based at least in part on cluster distribution ratios and/or per-cluster anomaly designations, by using predictive insights obtained via detecting patterns of top n highest utility filtered predictive inputs in a corresponding input cluster to generate anomaly predictions for bottom utility input clusters of the corresponding input cluster, various embodiments of the present invention avoid the need for performing complex computational operations on a portion of filtered predictive inputs of each input cluster. For example, in some embodiments, when used to determine anomaly detection labels for particular filtered predictive inputs, the cluster distribution ratios enable using predictive insights obtained via detecting patterns of top n highest utility filtered predictive inputs in a corresponding input cluster to generate anomaly predictions for bottom utility input clusters of the corresponding input cluster, a technique which avoids the need for performing complex computational operations on a portion of filtered predictive inputs of each input cluster.

An exemplary application of various embodiments of the present invention relate to identifying payment defects in low-dollar physician medical claims and offering an anomaly detection product for claim defect identification and for generating a business assessment based at least in part on the output of the claim defect identification process. In some embodiments, during the course of reviewing claims, the examiners may notice that certain codes or providers will contain false positives and may want to exclude those scenarios from being detected as overpaid by the overpayment detection method. In the normal course of events, this would mean finding the owner institutions and contacting them to request changes in method requirements. As many examiners could be working with the overpayment detection method, this will cause operational load challenges. To alleviate this problem, a software application can be created that is a copy of the claim processing user interface; however, instead of processing claims, the user interface depicts the logic of the overpayment detection method, and allows the method logic to be editable. When an examiner notices that a code or provider only provides false positives, he/she can go to the related data field as depicted by the user interface, click on it, and see the filters related to that field. The examiner can then choose drop-down options like 'exclude/include/contains/starts with' and type a code or provider into the box to improve accuracy/reliability of the overpayment detection method in the future.

II. Definitions

The term "predictive input" may refer to a data construct that describes a real-world entity and/or a virtual entity with respect to which one or more predictive anomaly detection operations are performed. An example of a predictive input is a line of a health insurance claim and/or a unit medical service described by a health insurance claim. An example of a predictive anomaly detection operation that may be performed with respect to a line of a health insurance claim and/or a unit medical service described by a health insurance claim is an operation that is configured to assess the likelihood that the claim line and/or unit service is subject to overpayment. However, a person of ordinary skill in the relevant technology will recognize that the techniques disclosed herein can be used to perform any anomaly detection tasks on any types of predictive inputs, especially when the volume of such predictive inputs is so huge as to make computationally expensive processing of each individual predictive input computationally excessively resource-intensive. In some embodiments, each predictive input is associated with a set of predictive input feature values, where each predictive input feature value has a distinct predictive input feature type. Accordingly, the set of predictive inputs may be associated with a schema/taxonomy defining a set of predictive input feature types. These predictive input feature types may in turn comprise a set of ranged predictive input feature types and a set of non-ranged predictive input feature types. A ranged predictive input feature type may be associated with a defined target range, where if a predictive input is associated with a predictive input feature value for the ranged predictive input feature type that falls within the target range for the ranged predictive input feature type, then this observation may be used to strengthen a predictive hypothesis that the predictive input is deemed anomalous.

The term "predictive input feature type" may refer to a data construct that describes a category of attributes of a set of predictive inputs. Examples of predictive input feature types for a predictive input may include: (i) a provider identifier, (ii) an expected utility measure (e.g., a billed amount), (iii) an actual utility measure (e.g., a paid amount), (iv) a predictive input type such as a procedure code (e.g., a Current Procedural Terminology (CPT) code), (v) a service unit number, (vii) a contract indicator describing a contract associated with the predictive input, (viii) a contract adjustment indicator describing whether a corresponding service has been subject to a contract adjustment, (ix) a copay adjustment indicator describing whether a corresponding service has been subject to a copay adjustment, (x) a sequestration adjustment indicator describing whether a corresponding service has been subject to a sequestration adjustment, (xi) a line of business, (xii) an adjuster identifier, (xiii) an automated adjustment indicator describing whether a corresponding service has been subject to automated (e.g., robot) adjustment, (xiv) a manually logged claim indicator for a corresponding claim, (xv) a system batch indicator for a corresponding claim, (xvi) a coordination of benefits (COB) indicator, (xvii) an indicator describing whether the expected utility measure of the predictive input equals the actual utility measure for the predictive input (e.g., whether a corresponding line/service has been paid at billed amount), (xviii) a risk reason code, (xix) a claim type for a corresponding claim, (xx) a value describing the difference between the actual utility measure for the predictive input and an average actual utility measure for predictive inputs that are associated with the provider identifier for the predictive identifier and the predictive input type for the predictive input (e.g., average amount paid by the same provider for lines/services having the same procedure code), (xxi) a value describing a ratio of the actual utility measure for the predictive input and an average actual utility measure for predictive inputs that are associated with the provider identifier for the predictive identifier and the predictive input type for the predictive input (e.g., average amount paid by the same provider for lines/services having the same procedure code), (xxii) a value describing a number of predictive inputs whose corresponding actual utility measures and expected utility measures are equal across all of predictive inputs that are associated with the provider identifier for the predictive identifier and the predictive input type for the predictive input, (xxiii) a value describing a ratio of predictive inputs whose corresponding actual utility measures and expected utility measures are equal across all of predictive inputs that are associated with the provider identifier for the predictive identifier and the predictive input type for the predictive input, and/or (xxiv) a value describing a suspected anomalous score (e.g., describing a suspected overpayment amount) for the predictive input as generated by an external anomaly detection model.

The term "randomized partitioning anomaly detection machine learning model" may refer to a data construct that describes parameters, hyperparameters, and/or defined operations of a machine learning model that is configured to partition a group of predictive inputs based at least in part on the sets of predictive input feature values associated with the group of predictive inputs and determine the randomized partitioning anomaly detection label for each predictive input based at least in part on a number of partitions performed to isolate each predictive input. In other words, in some embodiments, the randomized partitioning anomaly detection machine learning model may be configured to, for each predictive input in the group of predictive inputs: (i) identify a set of m predictive input features associated with the predictive input, (ii) map the predictive input to an m-dimensional space based at least in part on the set of m predictive input features for the predictive input, and (iii) determine a randomized partitioning anomaly detection label based at least in part on a number of partitions performed across the set of m predictive input features to isolate the predictive input. In some embodiments, the randomized partitioning anomaly detection machine learning model uses an isolation forest anomaly detection machine learning routine to generate an isolation forest data object, then determines a randomized partitioning anomaly detection score for each predictive input based at least in part on a distance of a leaf node of the predictive input in the isolation forest data object from a root node of the isolation forest, and then determines that a particular predictive input is associated an affirmative randomized partitioning anomaly detection label based at least in part on at least one of the following: (i) whether the randomized partitioning anomaly detection score for the particular predictive input satisfies (e.g., exceeds) a randomized partitioning anomaly detection score threshold, and (ii) whether the randomized partitioning anomaly detection score for the particular predictive input is among the top s randomized partitioning anomaly detection scores for all of the group of predictive inputs. In some embodiments, exemplary features of an isolation forest anomaly detection machine learning routine are described in Liu & Ting, *Isolation-Based Anomaly Detection*, ACM Transactions on Knowledge Discovery from Data (Volume 6, Issue 1, March 2021, Article No.: 3 pp 1-39), available online at https://dl.acm.org/doi/10.1145/2133360.2133363.

The term "rule-based partitioning anomaly detection model" may refer to a data construct that describes parameters, hyperparameters, and/or defined operations of a machine learning model (e.g., a rule-based model, a machine learning model using one or more trained parameters, and/or the like) that is configured to configured to assign an affirmative rule-based partitioning anomaly detection label to a predictive input that if rule-based classification feature values for the predictive input satisfies a partitioning rule, where the partitioning layer defines, for each rule-based classification feature type, a target range. In some embodiments, given a ranged subset of predictive input feature types for the group of predictive inputs, the set of rule-based classification feature types are determined based at least in part on the ranged subset. For example, in some embodiments, the partitioning rule describes that a predictive input should be associated with an affirmative rule-based partitioning anomaly detection score if all of the ranged predictive input feature values for the predictive input are within the target ranges for the corresponding ranged predictive input feature types. In some embodiments, the rule-based partitioning anomaly detection model defines k partitioning rules, where different partitioning rules may be assigned to different predictive inputs based at least in part on randomized partitioning anomaly detection scores for the predictive inputs. For example, in some embodiments, if the randomized partitioning anomaly detection score is within a defined low range, a first partitioning rule is applied; if the randomized partitioning anomaly detection score is within a defined medium range, a second partitioning rule is applied; and if the randomized partitioning anomaly detection score is within a defined high range, a third partitioning rule is applied.

The term "rule-based classification feature type" may refer to a data construct that describes a prediction input feature type that is used by a rule-based partitioning anomaly detection model to generate rule-based partitioning anomaly detection labels. For example, in some embodiments, a set of rule-based classification feature types (e.g., which may each correspond to one of the set of ranged predictive input feature types) include at least one of the following: (i) a rule-based classification feature type describing whether a predictive input (e.g., a health insurance claim line/health insurance unit service) is associated with a contract adjustment, (ii) a rule-based classification feature type describing a value of a difference between an expected utility measure for a predictive input (e.g., a billed amount for a health insurance claim line/health insurance unit service) and an actual utility measure for the predictive input (e.g., a paid amount for a health insurance claim line/health insurance unit service), (iii) a rule-based classification feature type describing a ratio of an actual utility measure for a predictive input (e.g., a paid amount for a health insurance claim line/health insurance unit service) to an expected utility measure for the predictive input, (iv) a rule-based classification feature type describing a ratio/percentage of predictive inputs (e.g., health insurance claim lines/health insurance unit services) that are deemed related to a predictive input (e.g., that are associated with a common provider identifier as the provider identifier for the predictive input, and/or that are associated with a common predictive input type such as a common procedure code as the predictive input type for the predictive input) and that are associated with equal-valued actual utility measures and expected utility measures (e.g., that are paid in full), (v) a rule-based classification feature type describing number of predictive inputs (e.g., health insurance claim lines/health insurance unit services) that are deemed related to a predictive input (e.g., that are associated with a common provider identifier as the provider identifier for the predictive input, and/or that are associated with a common predictive input type such as a common procedure code as the predictive input type for the predictive input) and that are associated with equal-valued actual utility measures and expected utility measures (e.g., that are paid in full), and/or (vi) a rule-based classification feature type describing an externally-generated anomaly detection score (e.g., suspected overpayment amount) for a predictive input.

The term "target range" may refer to a data construct that describes a range of potential values for a rule-based classification feature type that is used to define a condition of a partitioning rule used by rule-based partitioning anomaly detection model to generate rule-based partitioning anomaly detection labels. For example, given the set of rule-based classification feature types described in the preceding paragraph, rule-based classification feature types may be associated with the following target ranges: (i) {TRUE}, (ii) $(t_1, \infty)$, (iii) $[t_2, 1.0]$, (iv) $[0, t_3)$, (v) $[0, t_4)$, and $(t_4, \infty)$. Given the described target ranges, a partitioning rule may describe that a predictive input is deemed to be associated with an affirmative rule-based partitioning anomaly detection label if the predictive input is associated with: (i) a rule-based classification feature value for the first rule-based classification feature type that describes that the predictive input is subject to contract adjustments, (ii) a rule-based classification feature value for the second rule-based classification feature type that is greater than a threshold $t_1$ (e.g., is classified as being "high"), (iii) a rule-based classification feature value for the third rule-based classification feature type that is greater than a threshold $t_2$ (e.g., is classified as being "high"), (iv) a rule-based classification feature value for the fourth rule-based classification feature type that is less than a threshold $t_3$ (e.g., is classified as being "low"), (v) a rule-based classification feature value for the fifth rule-based classification feature type that is less than a threshold $t_4$ (e.g., is classified as being "low"), and (vi) a rule-based classification feature value for the sixth rule-based classification feature type that is greater than a threshold $t_5$ (e.g., is classified as being "high"). A person of ordinary skill in the relevant technology will recognize that, in some embodiments, at least some or at least all of the threshold values described above may be in the corresponding target ranges and may thus be the lowest or great values of the defined ranges. In each case, however, a threshold value is either a greatest lower bound or a least upper bound of a target range for a ranged predictive input feature (e.g., $t_1$ is the greatest lower bound of the target range $(t_1, \infty)$ for the second rule-based classification feature value).

The term "per-cluster anomaly designation" may refer to a data construct that describes an inferred pattern of ground-truth anomaly detection labels (e.g., confirmed investigation results, such as confirmed overpayment investigation results) for the top n filtered predictive inputs in a corresponding input cluster that have higher input utility measures among all of the filtered predictive inputs in the corresponding input cluster, where the input utility measure for a filtered predictive input may be determined based at least in part on at least one of the actual utility measure (e.g., a paid amount measure) or an expected utility measure (e.g., a billed amount measure) for the filtered predictive input (e.g., may be determined based at least in part on an average of the actual utility measure and the expected utility measure, may be determined based at least in part on a weighted average of the actual utility measure and the expected utility measure where the weight of the actual utility measure is determined based at least in part on a ratio of filtered predictive inputs in the corresponding input cluster that have equal-valued actual utility measures and expected utility measures, and/or the like). For example, the per-cluster anomaly designation for a corresponding input cluster may have an affirmative value if a required ratio (e.g. all) of the top n (e.g., top one) highest utility filtered predictive inputs in the corresponding input cluster have affirmative ground-truth anomaly detection labels (e.g., confirmed investigation results describing confirmed occurrence of an anomaly condition such as overpayment with respect to the top n highest utility filtered predictive inputs).

The term "cluster distribution ratio" may refer to a data construct that describes a ratio of: (i) an input utility measure for a corresponding filtered predictive input, and (ii) a cluster utility measure for the top n filtered predictive inputs in a corresponding input cluster that comprises the corresponding filtered predictive input and that have higher input utility measures among all of the filtered predictive inputs in the corresponding input cluster, where the input utility measure for a filtered predictive input may be determined based at least in part on at least one of the actual utility measure (e.g., a paid amount measure) or an expected utility measure (e.g., a billed amount measure) for the filtered predictive input (e.g., may be determined based at least in part on an average of the actual utility measure and the expected utility measure, may be determined based at least in part on a weighted average of the actual utility measure and the expected utility measure where the weight of the actual utility measure is determined based at least in part on a ratio of filtered predictive inputs in the corresponding input cluster that have equal-valued actual utility measures and expected utility measures, and/or the like). For example, in some embodiments, when n=1, then the cluster distribution ratio for a particular filtered predictive input may be determined based at least in part on a ratio of the input utility measure (e.g., billed amount, paid amount, a value determined based at least in part on the combination of the billed amount and the paid amount, and/or the like) for the particular filtered predictive input and the input utility measure for a filtered predictive input in the input cluster of the particular filtered predictive input whose input utility measure is higher than the input utility measures of all the other filtered predictive inputs in the noted input cluster. As another example, in some embodiments, when n>1, then the cluster distribution ratio for a particular filtered predictive input may be determined based at least in part on a ratio of the input utility measure (e.g., billed amount, paid amount, a value determined based at least in part on the combination of the billed amount and the paid amount, and/or the like) for the particular filtered predictive input and a measure of statistical distribution (e.g., an average, a median, and/or the like) of the utility input measures for the top n filtered predictive inputs in a corresponding input cluster that comprises the particular filtered predictive input and that have higher input utility measures among all of the filtered predictive inputs in the noted input cluster.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing health-related predictive data analysis. The architecture 100 includes a predictive data analysis system 101 configured to receive health-related predictive data analysis requests from external computing entities 102, process the predictive data analysis requests to generate predictions, provide the generated predictions to the external computing entities 102, and automatically perform classification-based actions based at least in part on the predictions.

Examples of classification-based actions include at least one of the following: (i) performing investigatory actions (e.g., performing higher-level investigatory actions for predictive inputs that are associated with a high anomaly detection label, performing lower-level investigatory actions for predictive inputs that are associated with a lower anomaly detection label, and/or the like), (ii) scheduling investigatory actions (e.g., scheduling higher-level investigatory actions for predictive inputs that are associated with a high anomaly detection label, scheduling lower-level investigatory actions for predictive inputs that are associated with a lower anomaly detection label, and/or the like), (iii) performing operational load balancing operations for a computing system configured to perform investigatory actions based at least in part on expected/scheduled/confirmed investigatory actions, (iv) closing investigatory cases of those predictive inputs that are associated with negative anomaly detection labels.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the predictions to the external computing entities 102, and automatically perform classification-based actions based at least in part on the generated predictions.

The storage subsystem 108 may be configured to store input data used by the predictive data analysis computing entity 106 to perform health-related predictive data analysis as well as model definition data used by the predictive data analysis computing entity 106 to perform various health-related predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.
Exemplary Predictive Data Analysis Computing Entity FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges associated with computational complexity of performing anomaly detection on a large number of predictive inputs by using a three-tiered unsupervised anomaly detection machine learning framework to perform high-volume anomaly detection and via utilizing a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

FIG. 4 is a flowchart diagram of an example process 400 for unsupervised anomaly detection. Via the various steps/operations of the process 400, the predictive data analysis computing entity 106 can use a three-tiered unsupervised anomaly detection machine learning framework to perform high-volume anomaly detection by using a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

The process 400 begins when the predictive data analysis computing entity 106 receives a group of predictive inputs 401. Examples of predictive inputs include a group of predictive inputs each pertaining to a unit healthcare service and/or line item of a health insurance claim that is associated with a provider identifier and a diagnosis/procedure code identifier.

In some embodiments, each predictive input is associated with: (i) a provider identifier, (ii) an expected utility measure (e.g., a billed amount), (iii) an actual utility measure (e.g., a paid amount), (iv) a predictive input type such as a procedure code (e.g., a Current Procedural Terminology (CPT) code), (v) a service unit number, (vii) a contract indicator describing a contract associated with the predictive input, (viii) a contract adjustment indicator describing whether a corresponding service has been subject to a contract adjustment, (ix) a copay adjustment indicator describing whether a corresponding service has been subject to a copay adjustment, (x) a sequestration adjustment indicator describing whether a corresponding service has been subject to a sequestration adjustment, (xi) a line of business, (xii) an adjuster identifier, (xiii) an automated adjustment indicator describing whether a corresponding service has been subject to automated (e.g., robot) adjustment, (xiv) a manually logged claim indicator for a corresponding claim, (xv) a system batch indicator for a corresponding claim, (xvi) a coordination of benefits (COB) indicator, (xvii) an indicator describing whether the expected utility measure of the predictive input equals the actual utility measure for the predictive input (e.g., whether a corresponding line/service has been paid at billed amount), (xviii) a risk reason code, (xix) a claim type for a corresponding claim, (xx) a value describing the difference between the actual utility measure for the predictive input and an average actual utility measure for predictive inputs that are associated with the provider identifier for the predictive identifier and the predictive input type for the predictive input (e.g., average amount paid by the same provider for lines/services having the same procedure code), (xxi) a value describing a ratio of the actual utility measure for the predictive input and an average actual utility measure for predictive inputs that are associated with the provider identifier for the predictive identifier and the predictive input type for the predictive input (e.g., average amount paid by the same provider for lines/services having the same procedure code), (xxii) a value describing a number of predictive inputs whose corresponding actual utility measures and expected utility measures are equal across all of predictive inputs that are associated with the provider identifier for the predictive identifier and the predictive input type for the predictive input, (xxiii) a value describing a ratio of predictive inputs whose corresponding actual utility measures and expected utility measures are equal across all of predictive inputs that are associated with the provider identifier for the predictive identifier and the predictive input type for the predictive input, and/or (xxiv) a value describing a suspected anomalous score (e.g., describing a suspected overpayment amount) for the predictive input as generated by an external anomaly detection model.

In some embodiments, each predictive input describes a real-world entity and/or a virtual entity with respect to which one or more predictive anomaly detection operations are performed. An example of a predictive input is a line of a health insurance claim and/or a unit medical service described by a health insurance claim. An example of a predictive anomaly detection operation that may be performed with respect to a line of a health insurance claim and/or a unit medical service described by a health insurance claim is an operation that is configured to assess the likelihood that the claim line and/or unit service is subject to overpayment. However, a person of ordinary skill in the relevant technology will recognize that the techniques disclosed herein can be used to perform any anomaly detection tasks on any types of predictive inputs, especially when the volume of such predictive inputs is so huge as to make computationally expensive processing of each individual predictive input computationally excessively resource-intensive.

In some embodiments, each predictive input is associated with a set of predictive input feature values, where each predictive input feature value has a distinct predictive input feature type. Accordingly, the set of predictive inputs may be associated with a schema/taxonomy defining a set of predictive input feature types. These predictive input feature types may in turn comprise a set of ranged predictive input feature types and a set of non-ranged predictive input feature types. A ranged predictive input feature type may be associated with a defined target range, where if a predictive input is associated with a predictive input feature value for the ranged predictive input feature type that falls within the target range for the ranged predictive input feature type, then this observation may be used to strengthen a predictive hypothesis that the predictive input is deemed anomalous.

For example, consider an operational example of a predictive input feature type that describes whether the expected utility measure (e.g., a billed amount) for a predictive input (e.g., a medical service/health insurance claim line) is equal to the actual utility measure (e.g., paid amount) for the predictive input (e.g., where the described ranged predictive input feature type may describe whether a medical service/health insurance claim line is paid at a billed amount). In this example, if configuration data associated with a corresponding predictive data analysis system describes that, when the expected utility measure (e.g., a billed amount) for a predictive input (e.g., a medical service/health insurance claim line) is equal to the actual utility measure (e.g., paid amount) for the predictive input, and thus the described predictive input feature type has an affirmative value, the predictive input is more likely to be anomalous, then because the described predictive input feature type is associated with a target range of {TRUE}, the described predictive input feature type is a ranged predictive input feature type. As another example, consider an operational example of a predictive input feature type that describes a value describing a ratio of predictive inputs whose corresponding actual utility measures and expected utility measures are equal across all of predictive inputs that are associated with the provider identifier for the predictive identifier and the predictive input type for the predictive input (e.g., a ratio of medical services/health insurance claim lines by a target provider and for a target procedure that are paid at billed amounts). In this example, if configuration data associated with a corresponding predictive data analysis system describes that, when the described ratio for a predictive input fails to satisfy (e.g., is below) a threshold ratio t, then the predictive input is more likely to be anomalous, then the described predictive input feature is a ranged predictive input feature because the described predictive input feature is associated with the target range [0, t).

Those predictive input feature types that are associated with a target range may be deemed to be in a ranged subset of predictive input feature types. Each predictive input feature type that is not in the ranged subset and thus is not associated with a target range may be referred to as a non-ranged predictive input feature type. For example, in some embodiments, the adjuster identifier associated with a predictive input is not associated with any target ranges, as having particular adjuster identifiers cannot reliably be used to make any inferences about whether corresponding predictive inputs are anomalous. In this example, the adjuster identifier predictive input feature type may be deemed to be a non-ranged predictive input feature type.

As further depicted in FIG. 4, the process 400 continues when the predictive data analysis computing entity 106 processes the group of predictive inputs 401 using a randomized partitioning anomaly detection machine learning model 411 of an unsupervised anomaly detection machine learning framework 402 to generate a group of randomized partitioning anomaly detection labels 421 for the group of predictive inputs 401. In some embodiments, the randomized partitioning anomaly detection machine learning model 411 is configured to generate, for each predictive input, a randomized partitioning anomaly detection label.

The randomized partitioning anomaly detection machine learning model 411 may be a machine learning model that is configured to partition the group of predictive inputs 401 based at least in part on the sets of predictive input feature values associated with the group of predictive inputs 401 and determine the randomized partitioning anomaly detection label for each predictive input based at least in part on a number of partitions performed to isolate each predictive input. In other words, in some embodiments, the randomized partitioning anomaly detection machine learning model 411 may be configured to, for each predictive input in the group of predictive inputs 401: (i) identify a set of m predictive input features associated with the predictive input, (ii) map the predictive input to an m-dimensional space based at least in part on the set of m predictive input features for the predictive input, and (iii) determine a randomized partitioning anomaly detection label based at least in part on a number of partitions performed across the set of m predictive input features to isolate the predictive input.

In some embodiments, the randomized partitioning anomaly detection machine learning model 411 uses an isolation forest anomaly detection machine learning routine to generate an isolation forest data object, then determines a randomized partitioning anomaly detection score for each predictive input based at least in part on a distance of a leaf node of the predictive input in the isolation forest data object from a root node of the isolation forest, and then determines that a particular predictive input is associated an affirmative randomized partitioning anomaly detection label based at least in part on at least one of the following: (i) whether the randomized partitioning anomaly detection score for the particular predictive input satisfies (e.g., exceeds) a randomized partitioning anomaly detection score threshold, and (ii) whether the randomized partitioning anomaly detection score for the particular predictive input is among the top s randomized partitioning anomaly detection scores for all of the group of predictive inputs 401. In some embodiments, exemplary features of an isolation forest anomaly detection machine learning routine are described in Liu & Ting, *Isolation-Based Anomaly Detection*, ACM Transactions on Knowledge Discovery from Data (Volume 6, Issue 1, March 2021, Article No.: 3 pp 1-39), available online at https://dl.acm.org/doi/10.1145/2133360.2133363.

In some embodiments, by using randomized partitions of a multi-dimensional space containing mappings of all of the group of predictive inputs 401 to generate anomaly scores/labels, the randomized partitioning anomaly detection machine learning model 411 is an ideal first tier layer for performing anomaly detection using unsupervised machine learning techniques. One reason for this inventive insight is that randomized partitions across a set of mappings can be performed on feature type level, rather than the individual feature value level, which avoids the need for performing complex operations on individual feature values of individual predictive inputs. For example, in some embodiments, the randomized partitioning anomaly detection machine learning model 411 can generate an isolation forest data object for each predictive input by repeatedly selecting a predictive input feature type from the set of predictive input feature types for the group of predictive inputs 401 and partitioning the range of the selected predictive input feature type into a set of sub-ranges associated with branches of a tree data object, where this repeated process is performed for the tree data object until each leaf node of the resulting tree data object is associated with only one predictive input (i.e., until each predictive input is isolated). The isolation forest data object may itself include one or more of these resulting tree data objects. Once generated, based at least in part on the assumption that more anomalous predictive inputs will be isolated faster, the distance between the tree nodes associated with the predictive input in the isolation forest data object and the root nodes of the isolation forest data object may be used as an inverse proxy for the anomalous scores of the predictive inputs. In this way, anomaly detection inferences can be generated by partitioning predictive inputs on an aggregate, feature-based level, while only performing computationally linear operations on individual feature values each predictive input.

In some embodiments, to generate the randomized partitioning anomaly detection label for a predictive input among the group of predictive inputs 401, the randomized partitioning anomaly detection machine learning model 411 first generates an isolation forest data object describing a set of one or more tree data object, where each tree non-leaf node of a tree data object describes a partition performed on a randomly-selected predictive input feature type to divide the range of the randomly-selected predictive input feature type into two or more subranges (e.g., into two or more randomly-generated sub-granges), and where each leaf node of a tree data object is associated with no less than and no more than one predictive input in the group of predictive inputs 401. Once generated, given r tree data objects in the isolation forest data object, each predictive input in the group of predictive inputs 401 is associated with r distance measures, where each r distance measure describes a number of tree links/edges between a root node of a tree data object and a leaf node of the tree data object that corresponds to the predictive input. Then, for each predictive input, the r distance measures of the predictive input may be combined to generate a unified distance measure for the predictive input, and the unified distance measure may be transformed using a defined transformation (e.g., an inverse function) whose output has a negative correlation with the unified distance measure feature. Afterward, the outputs of the described transformation can be used to generate randomized partitioning anomaly detection scores, which can then be used to assign randomized partitioning anomaly detection labels.

Accordingly, the randomized partitioning anomaly detection label for a predictive input may be a characterization of the predictive input that is determined based at least in part on the randomized partitioning anomaly detection score for the predictive input that is generated by a sub-ultimate layer of the randomized partitioning anomaly detection machine learning model 411. In some embodiments, the randomized partitioning anomaly detection machine learning model 411 has an ultimate layer that determines that a predictive input is associated with an affirmative randomized partitioning anomaly detection label if the randomized partitioning anomaly detection score for the predictive input as generated by the sub-ultimate layer of the randomized partitioning anomaly detection machine learning model 411 satisfies a threshold, and/or determines that a predictive input is associated with an affirmative randomized partitioning anomaly detection label if the randomized partitioning anomaly detection score for the predictive input as generated by the sub-ultimate layer of the randomized partitioning anomaly detection machine learning model 411 is among the top s randomized portioning anomaly detection scores for all of the group of predictive inputs 401 as determined by the sub-ultimate layer of the input as generated by the sub-ultimate layer of the randomized partitioning anomaly detection machine learning model 411.

In some embodiments, inputs to the randomized partitioning anomaly detection machine learning model 411 comprise, for each predictive input in the group of predictive inputs 401, a vector where each vector value describes a corresponding predictive input feature value of the predictive input for a predictive input feature type that is associated with the position of the vector value. In some embodiments, outputs of the randomized partitioning anomaly detection machine learning model 411 comprise, for each predictive input in the group of predictive inputs 401, a vector and/or an atomic value describing a randomized partitioning anomaly detection score and/or a randomized partitioning anomaly detection label for the predictive input.

As further depicted in FIG. 4, the process 400 continues when the predictive data analysis computing entity 106 uses a first tier filtering layer 412 of the unsupervised anomaly detection machine learning framework 402 to generate a set of refined predictive inputs 413 by excluding, from the group of predictive inputs 401, those predictive inputs that are not associated with an affirmative randomized partitioning anomaly detection label. Afterward, the process 400 continues when the predictive data analysis computing entity 106 processes the set of refined predictive inputs 413 using a rule-based partitioning anomaly detection model 414 to generate a group of rule-based partitioning anomaly detection labels 422 that comprise, for each refined predictive input 413 (e.g., for each predictive input in the group of predictive inputs 401 that are associated with an affirmative randomized partitioning anomaly detection label), a rule-based partitioning anomaly detection label.

The rule-based partitioning anomaly detection model 414 may be configured to assign an affirmative rule-based partitioning anomaly detection label to a predictive input that if rule-based classification feature values for the predictive input satisfies a partitioning rule, where the partitioning layer defines, for each rule-based classification feature type, a target range. In some embodiments, given a ranged subset of predictive input feature types for the group of predictive inputs, the set of rule-based classification feature types are determined based at least in part on the ranged subset. For example, in some embodiments, the partitioning rule describes that a predictive input should be associated with an affirmative rule-based partitioning anomaly detection score if all of the ranged predictive input feature values for the predictive input are within the target ranges for the corresponding ranged predictive input feature types. In some embodiments, the rule-based partitioning anomaly detection model 414 defines k partitioning rules, where different partitioning rules may be assigned to different predictive inputs based at least in part on randomized partitioning anomaly detection scores for the predictive inputs. For example, in some embodiments, if the randomized partitioning anomaly detection score is within a defined low range, a first partitioning rule is applied; if the randomized partitioning anomaly detection score is within a defined medium range, a second partitioning rule is applied; and if the randomized partitioning anomaly detection score is within a defined high range, a third partitioning rule is applied.

In some embodiments, a partitioning rule of the rule-based partitioning anomaly detection model 414 defines a set of ranges for a set of rule-based classification feature types where, if the set of rule-based classification feature values of a predictive input with respect to the rule-based classification feature types fall within corresponding ranges, then the predictive input is deemed to be a "perfect anomaly" (e.g., a perfect overpayment case).

For example, in some embodiments, the set of rule-based classification feature types (e.g., which may each correspond to one of the set of ranged predictive input feature types) include at least one of the following: (i) a rule-based classification feature type describing whether a predictive input (e.g., a health insurance claim line/health insurance unit service) is associated with a contract adjustment, (ii) a rule-based classification feature type describing a value of a difference between an expected utility measure for a predictive input (e.g., a billed amount for a health insurance claim line/health insurance unit service) and an actual utility measure for the predictive input (e.g., a paid amount for a health insurance claim line/health insurance unit service), (iii) a rule-based classification feature type describing a ratio of an actual utility measure for a predictive input (e.g., a paid amount for a health insurance claim line/health insurance unit service) to an expected utility measure for the predictive input, (iv) a rule-based classification feature type describing a ratio/percentage of predictive inputs (e.g., health insurance claim lines/health insurance unit services) that are deemed related to a predictive input (e.g., that are associated with a common provider identifier as the provider identifier for the predictive input, and/or that are associated with a common predictive input type such as a common procedure code as the predictive input type for the predictive input) and that are associated with equal-valued actual utility measures and expected utility measures (e.g., that are paid in full), (v) a rule-based classification feature type describing number of predictive inputs (e.g., health insurance claim lines/health insurance unit services) that are deemed related to a predictive input (e.g., that are associated with a common provider identifier as the provider identifier for the predictive input, and/or that are associated with a common predictive input type such as a common procedure code as the predictive input type for the predictive input) and that are associated with equal-valued actual utility measures and expected utility measures (e.g., that are paid in full), and (vi) a rule-based classification feature type describing an externally-generated anomaly detection score (e.g., suspected overpayment amount) for a predictive input.

In some of the embodiments described in the above paragraph, the above-described rule-based classification feature types are associated with the following target ranges: (i) {TRUE}, (ii) $(t_1, \infty)$, (iii) $\lfloor t_2, 1.0 \rfloor$, (iv) $\lfloor 0, t_3)$, (v) $\lfloor 0, t_4)$, and $(t_4, \infty)$. Given the described target ranges, a partitioning rule may describe that a predictive input is deemed to be associated with an affirmative rule-based partitioning anomaly detection label if the predictive input is associated with: (i) a rule-based classification feature value for the first rule-based classification feature type that describes that the predictive input is subject to contract adjustments, (ii) a rule-based classification feature value for the second rule-based classification feature type that is greater than a threshold $t_1$ (e.g., is classified as being "high"), (iii) a rule-based classification feature value for the third rule-based classification feature type that is greater than a threshold $t_2$ (e.g., is classified as being "high"), (iv) a rule-based classification feature value for the fourth rule-based classification feature type that is less than a threshold $t_3$ (e.g., is classified as being "low"), (v) a rule-based classification feature value for the fifth rule-based classification feature type that is less than a threshold $t_4$ (e.g., is classified as being "low"), and (vi) a rule-based classification feature value for the sixth rule-based classification feature type that is greater than a threshold $t_5$ (e.g., is classified as being "high"). A person of ordinary skill in the relevant technology will recognize that, in some embodiments, at least some or at least all of the threshold values described above may be in the corresponding target ranges and may thus be the lowest or great values of the defined ranges. In each case, however, a threshold value is either a greatest lower bound or a least upper bound of a target range for a ranged predictive input feature (e.g., $t_1$ is the greatest lower bound of the target range $(t_1, \infty)$ for the second rule-based classification feature value).

In some embodiments, inputs to the rule-based partitioning anomaly detection model 414 include, for each refined predictive input of the group of refined predictive inputs 413, a vector describing rule-based classification feature values of the refined predictive input. In some embodiments, outputs of the rule-based partitioning anomaly detection model 414 include, for refined predictive input of the group of refined predictive inputs 413, a vector or an atomic value describing the rule-based partitioning anomaly detection label for the refined predictive input. In some embodiments, the rule-based partitioning anomaly detection model 414 assigns, to each predictive input in the group of predictive inputs 401 that is not among the group of refined predictive inputs 413, a negative anomaly detection label describing that the predictive input is not deemed anomalous.

In some embodiments, by using rule-based determinations based at least in part on target ranges for ranged predictive input features, the rule-based partitioning anomaly detection model is an ideal second tier layer for performing anomaly detection using unsupervised machine learning techniques. One reason for this inventive insight is that, because rule-based operations can be performed with linear computational complexity with respect to the predictive inputs that have already survived the first-tier filtering, the need for performing complex per-input operations is avoided and even linear per-input operations are performed only on a subset of input data that have survived the first-tier filtering that is performed based at least in part on the predictions generated by the randomized partitioning anomaly detection machine learning model.

As further depicted in FIG. 4, the process 400 continues when the predictive data analysis computing entity 106 uses a second tier filtering layer 415 of the unsupervised anomaly detection machine learning framework 402 to generate a group of filtered predictive inputs 416 by excluding, from the group of refined predictive inputs 413, those predictive inputs that are not associated with an affirmative rule-based partitioning anomaly detection label. Afterward, the process 400 continues when the predictive data analysis computing entity 106 processes the set of filtered predictive inputs 416 using a third tier classification layer 417 of the unsupervised anomaly detection machine learning framework 402 to generate a group of anomaly detection labels 403 that comprise, for each filtered predictive input in the group of filtered predictive inputs 416, an anomaly detection label.

In some embodiments, the group of anomaly detection labels 403 comprise an anomaly detection label for each predictive input in the group of predictive inputs 401. In some embodiments, for each predictive input that is among the group of predictive inputs 401 but not among the group of filtered predictive inputs 416 (i.e., for each predictive input in the group of predictive inputs 401 that is associated with a negative randomized partitioning anomaly detection label, or that is associated with an affirmative randomized partitioning anomaly detection label and a negative rule-based partitioning anomaly detection label), the third tier classification layer 417 generates a negative anomaly detection label describing that the predictive input is not predicted to be anomalous and should not be subject to any investigatory actions/analyses. In some embodiments, for each predictive input that is among the group of filtered predictive inputs, the third tier classification layer 417 generates an anomaly detection label based at least in part on: (i) a per-cluster anomaly designation for an input cluster of the predictive input that may be determined based at least in part on ground-truth anomaly detection labels for n highest utility filtered predictive inputs in the input cluster, and (ii) a cluster distribution ratio of: (i) an input utility measure for the filtered predictive input, and (ii) a cluster utility measure that is determined based at least in part on (e.g., using a statistical distribution measure of) the n input utility measures for the n highest utility filtered predictive inputs in the input cluster that comprises the filtered predictive input.

In some embodiments, for each filtered predictive input in the group of filtered predictive inputs 416, in response to determining that the per-cluster anomaly designation for the input cluster that comprises the filtered predictive input is an affirmative per-cluster anomaly designation, the anomaly detection label for the filtered predictive is determined input based at least in part on a cluster distribution ratio of: (i) an input utility measure for the filtered predictive input, and/or (ii) a cluster utility measure for the n highest utility filtered predictive inputs in the input cluster that comprises the filtered predictive input. For example, in some embodiments, determining the anomaly detection label for a filtered predictive input whose corresponding input cluster is associated with an affirmative per-cluster anomaly designation comprises, in response to determining that the cluster distribution ratio for the filtered predictive input satisfies a proximity cluster distribution ratio threshold, determining that the filtered predictive input is associated with a high anomaly detection label. As another example, in some embodiments, determining the anomaly detection label for a filtered predictive input whose corresponding input cluster is associated with an affirmative per-cluster anomaly designation comprises, in response to determining that the cluster distribution ratio for the filtered predictive input fails to satisfy the proximity cluster distribution ratio threshold, determining that the filtered predictive input is associated with a low anomaly detection label. As yet another example, in some embodiments, in response to determining that the per-cluster anomaly designation for the input cluster that comprises a filtered predictive input is a negative per-cluster anomaly designation, a negative anomaly detection label is determined for the filtered predictive input.

In some embodiments, the third tier classification layer 417 has the exemplary architecture that is depicted in FIG. 5. As depicted in FIG. 5, the third tier classification layer 417 comprises a clustering machine learning model 501 and an intra-cluster processing engine 502. The clustering machine learning model 501 may be configured to generate a plurality of input clusters 511 for the group of filtered predictive inputs 416 in a manner such that each filtered predictive input is assigned to one input cluster of the plurality of input clusters 511. The clustering machine learning model 501 may use any combination of one or more clustering routines and/or any combination of defined feature spaces (e.g., feature spaces associated with dimensions corresponding to the set of predictive input feature types for the group of predictive inputs 401, feature spaces associated with dimensions corresponding to the set of ranged predictive input feature types for the group of predictive inputs 401, feature spaces associated with dimensions corresponding to the set of non-ranged predictive input feature types for the group of predictive inputs 401, feature spaces associated with dimensions corresponding to the set of rule-based classification feature types, and/or the like) to generate the plurality of input clusters 511. Examples of clustering routines may include k-means clustering routines, density-based spatial clustering of applications with noise (DBSCAN) clustering routines, and/or the like. In some embodiments, the group of filtered predictive inputs 416 are divided into the plurality of input clusters 511 based at least in part on a set of defined feature types, such as a combination of a provider identifier feature type and a predictive input type feature type (e.g., a procedure code feature type). For example, in some embodiments, the group of filtered predictive inputs 416 are divided into the plurality of input clusters 511 based at least in part on a combination of a provider identifier feature type and a procedure code feature type, such that each input cluster comprises filtered predictive inputs 416 that are associated with a common provider identifier and a common procedure code, and thus each filtered predictive input is grouped/clustered together with other filtered predictive inputs having the same provider identifier as the provider identifier for the noted filtered predictive input and the same procedure code as the procedure code for the noted filtered predictive input.

As further depicted in FIG. 5, once the plurality of input clusters 511 are generated by the clustering machine learning model 501, the intra-cluster processing engine 502 determines an anomaly detection label for each filtered predictive input based at least in part on the input cluster that is assigned to the filtered predictive input. Accordingly, the intra-cluster processing engine 502 determines the group of anomaly detection labels 403 based at least in part on associations between the plurality of input clusters 511 and the group of filtered predictive inputs 416.

In some embodiments, the intra-cluster processing engine 502 first determines a per-cluster anomaly designation for each input cluster of the plurality of input clusters 511. Then: (i) for those filtered predictive inputs among the group of filtered predictive inputs 416 that are associated with an input cluster having an affirmative per-cluster anomaly designation, the intra-cluster processing engine 502 determines a high anomaly detection label if the cluster distribution ratio for the filtered predictive input satisfies a proximity cluster distribution ratio threshold and determines a medium anomaly detection label if the cluster distribution ratio for the filtered predictive input fails to satisfy the proximity cluster distribution ratio threshold, and (ii) for those filtered predictive inputs among the group of filtered predictive inputs 416 that are associated with an input cluster having a negative per-cluster anomaly designation, the intra-cluster processing engine 502 determines a negative anomaly detection label.

In some embodiments, the intra-cluster processing engine 502 is configured to perform the steps/operations of the process that is depicted in FIG. 6, which is an example process for determining the anomaly detection label for a particular filtered predictive input. The process that is depicted in FIG. 6 begins at step/operation 601 when the predictive data analysis computing entity 106 determines whether the per-cluster anomaly designation for the input cluster that comprises the particular filtered predictive input is an affirmative per-cluster anomaly designation.

In some embodiments, a per-cluster anomaly designation describes an inferred pattern of ground-truth anomaly detection labels (e.g., confirmed investigation results, such as confirmed overpayment investigation results) for the top n filtered predictive inputs in a corresponding input cluster that have higher input utility measures among all of the filtered predictive inputs in the corresponding input cluster, where the input utility measure for a filtered predictive input may be determined based at least in part on at least one of the actual utility measure (e.g., a paid amount measure) or an expected utility measure (e.g., a billed amount measure) for the filtered predictive input (e.g., may be determined based at least in part on an average of the actual utility measure and the expected utility measure, may be determined based at least in part on a weighted average of the actual utility measure and the expected utility measure where the weight of the actual utility measure is determined based at least in part on a ratio of filtered predictive inputs in the corresponding input cluster that have equal-valued actual utility measures and expected utility measures, and/or the like). For example, the per-cluster anomaly designation for a corresponding input cluster may have an affirmative value if a required ratio (e.g. all) of the top n (e.g., top one) highest utility filtered predictive inputs in the corresponding input cluster have affirmative ground-truth anomaly detection labels (e.g., confirmed investigation results describing confirmed occurrence of an anomaly condition such as overpayment with respect to the top n highest utility filtered predictive inputs). In some embodiments, an input utility measure describes the unit price of a corresponding service/line.

In some embodiments, to determine the per-cluster anomaly designation for a particular input cluster, the following operations are performed: (i) determining the n (e.g., top one) highest utility filtered predictive inputs in the input cluster, (ii) determining a ratio of the n highest utility filtered predictive inputs that have affirmative ground-truth anomaly detection labels, (iii) determining whether the ratio satisfies a ratio threshold, and (iv) determining that the per-cluster anomaly designation has an affirmative value if the ratio satisfies the ratio threshold and a negative value otherwise. In some embodiments, by using predictive insights obtained via detecting patterns of top n highest utility filtered predictive inputs in a corresponding input cluster to generate anomaly predictions for bottom utility input clusters of the corresponding input cluster, various embodiments of the present invention avoid the need for performing complex computational operations on a portion of filtered predictive inputs of each input cluster, as further described below.

At step/operation 602, in response to determining that the per-cluster anomaly designation for the input cluster that comprises the particular filtered predictive input is a negative per-cluster anomaly designation, the predictive data analysis computing entity 106 determines that the particular filtered predictive input is associated with a negative anomaly detection label. A negative anomaly detection label may describe that no needs for any investigatory analysis (e.g., overpayment investigatory analysis) of the data corresponding to the particular filtered predictive input is recommended.

At step/operation 603, in response to determining that the per-cluster anomaly designation for the input cluster that comprises the particular filtered predictive input is an affirmative per-cluster anomaly designation, the predictive data analysis computing entity 106 determines whether the cluster distribution ratio for the filtered predictive input satisfies (e.g., falls above, falls above or is equal to, and/or the like) a proximity cluster distribution ratio threshold (e.g., a proximity cluster distribution ratio threshold of 90 percent).

In some embodiments, a cluster distribution ratio describes a cluster distribution ratio of: (i) an input utility measure for a corresponding filtered predictive input, and (ii) a cluster utility measure that is determined based at least in part on the input utility measures for the top n filtered predictive inputs in a corresponding input cluster that comprises the corresponding filtered predictive input and that have higher input utility measures among all of the filtered predictive inputs in the corresponding input cluster, where the input utility measure for a filtered predictive input may be determined based at least in part on at least one of the actual utility measure (e.g., a paid amount measure) or an expected utility measure (e.g., a billed amount measure) for the filtered predictive input (e.g., may be determined based at least in part on an average of the actual utility measure and the expected utility measure, may be determined based at least in part on a weighted average of the actual utility measure and the expected utility measure where the weight of the actual utility measure is determined based at least in part on a ratio of filtered predictive inputs in the corresponding input cluster that have equal-valued actual utility measures and expected utility measures, and/or the like).

For example, in some embodiments, when n=1, then the cluster distribution ratio for a particular filtered predictive input may be determined based at least in part on a ratio of the input utility measure (e.g., billed amount, paid amount, a value determined based at least in part on the combination of the billed amount and the paid amount, and/or the like) for the particular filtered predictive input and the input utility measure for a filtered predictive input in the input cluster of the particular filtered predictive input whose input utility measure is higher than the input utility measures of all the other filtered predictive inputs in the noted input cluster. As another example, in some embodiments, when n>1, then the cluster distribution ratio for a particular filtered predictive input may be determined based at least in part on a ratio of the input utility measure (e.g., billed amount, paid amount, a value determined based at least in part on the combination of the billed amount and the paid amount, and/or the like) for the particular filtered predictive input and a measure of statistical distribution (e.g., an average, a median, and/or the like) of the utility input measures for the top n filtered predictive inputs in a corresponding input cluster that comprises the particular filtered predictive input and that have higher input utility measures among all of the filtered predictive inputs in the noted input cluster.

In some embodiments, to determine the cluster distribution ratio for a particular filtered predictive input, the following operations are performed: (i) identifying the input cluster that comprises the particular filtered predictive input, (ii) determining the top n highest utility filtered predictive inputs in the identified input cluster, (iii) determining an aggregate utility measure of the input utility measures of the top n highest utility filtered predictive inputs, and (iv) determining the cluster distribution ratio based at least in part on a ratio of the input utility measure for the particular filtered predictive input and the determined aggregate utility measure. In some embodiments, when used to determine anomaly detection labels for particular filtered predictive inputs, the cluster distribution ratios enable using predictive insights obtained via detecting patterns of top n highest utility filtered predictive inputs in a corresponding input cluster to generate anomaly predictions for bottom utility input clusters of the corresponding input cluster, a technique which avoids the need for performing complex computational operations on a portion of filtered predictive inputs of each input cluster.

At step/operation 604, in response to determining that the cluster distribution ratio for the particular filtered predictive input fails to satisfy the cluster distribution ratio threshold (e.g., is below 90 percent), the predictive data analysis computing entity 106 determines that the anomaly detection label for the particular filtered predictive input is a low anomaly detection label. A low anomaly detection label may describe that a lower-level investigatory action (e.g., an automated and/or manual review) of the data corresponding to the particular filtered predictive input is recommended.

At step/operation 605, in response to determining that the cluster distribution ratio for the particular filtered predictive input satisfies the cluster distribution ratio threshold (e.g., is above or equal to 90 percent), the predictive data analysis computing entity 106 determines that the anomaly detection label for the particular filtered predictive input is a high anomaly detection label. A high anomaly detection label may describe that a lower-level investigatory action (e.g., an automated and/or manual full-fledged investigation) of the data corresponding to the particular filtered predictive input is recommended.

Once generated, the group of anomaly detection labels 403 can be used to perform prediction-based actions. Examples of prediction-based actions may include: (i) performing investigatory actions (e.g., performing higher-level investigatory actions for predictive inputs that are associated with a high anomaly detection label, performing lower-level investigatory actions for predictive inputs that are associated with a lower anomaly detection label, and/or the like), (ii) scheduling investigatory actions (e.g., scheduling higher-level investigatory actions for predictive inputs that are associated with a high anomaly detection label, scheduling lower-level investigatory actions for predictive inputs that are associated with a lower anomaly detection label, and/or the like), (iii) performing operational load balancing operations for a computing system configured to perform investigatory actions based at least in part on expected/scheduled/confirmed investigatory actions, (iv) closing investigatory cases of those predictive inputs that are associated with negative anomaly detection labels.

In some embodiments, using the third tier of the unsupervised anomaly detection machine learning framework that uses a clustering machine learning model and intra-cluster inferences performed based at least in part on cluster distribution ratios and/or per-cluster anomaly designations, by using predictive insights obtained via detecting patterns of top n highest utility filtered predictive inputs in a corresponding input cluster to generate anomaly predictions for bottom utility input clusters of the corresponding input cluster, various embodiments of the present invention avoid the need for performing complex computational operations on a portion of filtered predictive inputs of each input cluster. For example, in some embodiments, when used to determine anomaly detection labels for particular filtered predictive inputs, the cluster distribution ratios enable using predictive insights obtained via detecting patterns of top n highest utility filtered predictive inputs in a corresponding input cluster to generate anomaly predictions for bottom utility input clusters of the corresponding input cluster, a technique which avoids the need for performing complex computational operations on a portion of filtered predictive inputs of each input cluster.

In some embodiments, performing the prediction-based actions includes generating user interface data that can be used to display a prediction output user interface that describes, from a set of predictive inputs, a subset of the predictive inputs that are subject to higher-level investigatory actions and a subset of the predictive inputs that are subject to lower-level investigatory actions. For example, as depicted in the prediction output user interface 700 of FIG. 7, a set of predictive inputs corresponding to unit healthcare services of a common provider with respect to a common procedure code include: (i) two services 701 valued between $400-$700 which are not paid at billed and which are deemed to be associated with lower-level investigatory actions, and (ii) three services 702 that are valued between $2500-$2700 which are paid at billed and which are deemed to be associated with higher-level investigatory actions.

As described above, various embodiments of the present invention address technical challenges associated with computational complexity of performing anomaly detection on a large number of predictive inputs by using a three-tiered unsupervised anomaly detection machine learning framework to perform high-volume anomaly detection and via utilizing a first tier anomaly detection tier that uses a randomized partitioning anomaly detection machine learning model (e.g., an isolation forest anomaly detection machine learning model), a second tier anomaly detection tier that uses a rule-based partitioning anomaly detection model, and a third tier anomaly detection tier that uses a clustering machine learning model and intra-cluster inferences performed based at least in part on cluster distribution ratios and/or per-cluster anomaly designations.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, a plurality of predictive inputs for a three-tiered unsupervised anomaly detection machine learning framework and an anomaly detection label for a filtered predictive input, wherein (i) the three-tiered unsupervised anomaly detection machine learning framework comprises (a) a randomized partitioning anomaly detection machine learning model, (b) a rule-based partitioning anomaly detection model, and (c) a clustering machine learning model, and (ii) the anomaly detection label for the filtered predictive input is generated by the three-tiered unsupervised anomaly detection machine learning framework by:

determining, using the randomized partitioning anomaly detection machine learning model, a randomized partitioning anomaly detection label for a first predictive input of the plurality of predictive inputs,
   in response to a first determination that the first predictive input is associated with an affirmative randomized partitioning anomaly detection label, determining, using the rule-based partitioning anomaly detection model, a rule-based partitioning anomaly detection label based at least in part on the first predictive input,
   identifying the first predictive input as the filtered predictive input by excluding a second predictive input, of the plurality of predictive inputs, from the plurality of predictive inputs based on a second determination that the second predictive input is not associated with an affirmative rule-based partitioning anomaly detection label,
   determining, using the clustering machine learning model, an input cluster based at least in part on the filtered predictive input,
   determining an anomaly designation for the input cluster based at least in part on a ground-truth anomaly detection label for a highest utility filtered predictive input in the input cluster, and
   in response to determining that the anomaly designation for the input cluster is an affirmative anomaly designation, determining the anomaly detection label for the filtered predictive input based at least in part on a cluster distribution ratio of: (i) an input utility measure for the filtered predictive input, and (ii) a cluster utility measure for the highest utility filtered predictive input in the input cluster; and
   initiating, by the one or more processors, performance of an operational load balancing operation for a computing system configured to perform one or more investigatory actions based at least in part on the anomaly detection label.

2. The computer-implemented method of claim 1, wherein determining the anomaly detection label for the filtered predictive input further comprises:
   in response to determining that the cluster distribution ratio for the filtered predictive input satisfies a proximity cluster distribution ratio threshold, determining that the filtered predictive input is associated with a high anomaly detection label.

3. The computer-implemented method of claim 1, wherein determining the anomaly detection label for the filtered predictive input further comprises:
   in response to determining that the cluster distribution ratio for the filtered predictive input fails to satisfy a proximity cluster distribution ratio threshold, determining that the filtered predictive input is associated with a low anomaly detection label.

4. The computer-implemented method of claim 3, further comprising:
   in response to determining that another anomaly designation for another input cluster is a negative anomaly designation, determining a negative anomaly detection label.

5. The computer-implemented method of claim 4, further comprising:
   in response to determining that the randomized partitioning anomaly detection label for the first predictive input is a negative randomized partitioning anomaly detection label, or that the rule-based partitioning anomaly detection label for the first predictive input is a negative rule-based partitioning anomaly detection label, determining that the first predictive input is associated with the negative anomaly detection label.

6. The computer-implemented method of claim 1, wherein the rule-based partitioning anomaly detection model is configured to:

extract a rule-based classification feature value associated with a rule-based classification feature type, determine a target range for the rule-based classification feature type, and determine the rule-based partitioning anomaly detection label for the first predictive input based at least in part on the rule-based classification feature value and the target range for the rule-based classification feature type that is associated with the rule-based classification feature value.

7. The computer-implemented method of claim 6, wherein:

the first predictive input is associated with an input feature value associated with an input feature type;

the input feature type is associated with the target range;

the randomized partitioning anomaly detection machine learning model is associated with an isolation tree that is generated based at least in part on the input feature type, and the rule-based partitioning anomaly detection model is associated with the rule-based classification feature type.

8. A system comprising:

one or more processors; and one or more memories storing processor-executable instructions that, when executed by the one or more processors, cause the one or more processors to perform operations comprising:

receive a plurality of predictive inputs for a three-tiered unsupervised anomaly detection machine learning framework and an anomaly detection label for a filtered predictive input, wherein (i) the three-tiered unsupervised anomaly detection machine learning framework comprises (a) a randomized partitioning anomaly detection machine learning model, (b) a rule-based partitioning anomaly detection model, and (c) a clustering machine learning model, and (ii) the anomaly detection label for the filtered predictive input is generated by the three-tiered unsupervised anomaly detection machine learning framework by:

determining, using the randomized partitioning anomaly detection machine learning model, a randomized partitioning anomaly detection label for a first predictive input of the plurality of predictive inputs, in response to a first determination that the first predictive input is associated with an affirmative randomized partitioning anomaly detection label, determining, using the rule-based partitioning anomaly detection model, a rule-based partitioning anomaly detection label based at least in part on the first predictive input, identifying the first predictive input as the filtered predictive input by excluding a second predictive input, of the plurality of predictive inputs, from the plurality of predictive inputs based on a second determination that the second predictive input is not associated with an affirmative rule-based partitioning anomaly detection label,

determining, using the clustering machine learning model, an input cluster based at least in part on the filtered predictive input, determining an anomaly designation for the input cluster based at least in part on a ground-truth anomaly detection label for a highest utility filtered predictive input in the input cluster, and in response to determining that the anomaly designation for the input cluster is an affirmative anomaly designation, determining the anomaly detection label for the filtered predictive input based at least in part on a cluster distribution ratio of: (i) an input utility measure for the filtered predictive input, and (ii) a cluster utility measure for the highest utility filtered predictive input in the input cluster; and initiating performance of an operational load balancing operation for a computing system configured to perform one or more investigatory actions based at least in part on the anomaly detection label.

9. The system of claim 8, wherein determining the anomaly detection label for the filtered predictive input further comprises:

in response to determining that the cluster distribution ratio for the filtered predictive input satisfies a proximity cluster distribution ratio threshold, determining that the filtered predictive input is associated with a high anomaly detection label.

10. The system of claim 8, wherein determining the anomaly detection label for the filtered predictive input further comprises:

in response to determining that the cluster distribution ratio for the filtered predictive input fails to satisfy a proximity cluster distribution ratio threshold, determining that the filtered predictive input is associated with a low anomaly detection label.

11. The system of claim 10, wherein the operations further comprise:

in response to determining that another anomaly designation for another input cluster is a negative anomaly designation, determining a negative anomaly detection label.

12. The system of claim 11, wherein the operations further comprise:

in response to determining that the randomized partitioning anomaly detection label for the first predictive input is a negative randomized partitioning anomaly detection label, or that the rule-based partitioning anomaly detection label for the first predictive input is a negative rule-based partitioning anomaly detection label, determining that the first predictive input is associated with the negative anomaly detection label.

13. The system of claim 8, wherein the rule-based partitioning anomaly detection model is configured to:

extract a rule-based classification feature value associated with a rule-based classification feature type, determine a target range for the rule-based classification feature type, and determine the rule-based partitioning anomaly detection label for the first predictive input based at least in part on the rule-based classification feature value and the target range for the rule-based classification feature type that is associated with the rule-based classification feature value.

14. The system of claim 13, wherein:

the first predictive input is associated with an input feature value associated with an input feature type;

the input feature type is associated with the target range;

the randomized partitioning anomaly detection machine learning model is associated with an isolation tree that is generated based at least in part on the input feature type, and the rule-based partitioning anomaly detection model is associated with the rule-based classification feature type.

15. One or more non-transitory computer-readable media storing processor-executable instructions that, when executed by one or more processors, cause the one or more processors to perform operations comprising:

receive a plurality of predictive inputs for a three-tiered unsupervised anomaly detection machine learning framework and an anomaly detection label for a filtered predictive input, wherein (i) the three-tiered unsupervised anomaly detection machine learning framework comprises (a) a randomized partitioning anomaly detection machine learning model, (b) a rule-based partitioning anomaly detection model, and (c) a clustering machine learning model, and (ii) the anomaly detection label for the filtered predictive input is generated by the three-tiered unsupervised anomaly detection machine learning framework by:

determining, using the randomized partitioning anomaly detection machine learning model, a randomized partitioning anomaly detection label for a first predictive input of the plurality of predictive inputs, in response to a first determination that the first predictive input is associated with an affirmative randomized partitioning anomaly detection label, determining, using the rule-based partitioning anomaly detection model, a rule-based partitioning anomaly detection label based at least in part on the first predictive input, identifying the first predictive input as the filtered predictive input by excluding a second predictive input, of the plurality of predictive inputs, from the plurality of predictive inputs based on a second determination that the second predictive input is not associated with an affirmative rule-based partitioning anomaly detection label, determining, using the clustering machine learning model, an input cluster based at least in part on the filtered predictive input, determining an anomaly designation for the input cluster based at least in part on a ground-truth anomaly detection label for a highest utility filtered predictive input in the input cluster, and in response to determining that the anomaly designation for the input cluster is an affirmative anomaly designation, determining the anomaly detection label for the filtered predictive input based at least in part on a cluster distribution ratio of: (i) an input utility measure for the filtered predictive input, and (ii) a cluster utility measure for the highest utility filtered predictive input in the input cluster; and initiating performance of an operational load balancing operation for a computing system configured to perform one or more investigatory actions based at least in part on the anomaly detection label.

16. The one or more non-transitory computer-readable media of claim 15, wherein determining the anomaly detection label for the filtered predictive input further comprises:

in response to determining that the cluster distribution ratio for the filtered predictive input satisfies a proximity cluster distribution ratio threshold, determining that the filtered predictive input is associated with a high anomaly detection label.

17. The one or more non-transitory computer-readable media of claim 15, wherein determining the anomaly detection label for the filtered predictive input further comprises:

in response to determining that the cluster distribution ratio for the filtered predictive input fails to satisfy a proximity cluster distribution ratio threshold, determining that the filtered predictive input is associated with a low anomaly detection label.

18. The one or more non-transitory computer-readable media of claim 17, further comprising:

in response to determining that another anomaly designation for another input cluster is a negative anomaly designation, determining a negative anomaly detection label.

19. The one or more non-transitory computer-readable media of claim 15, wherein the rule-based partitioning anomaly detection model is configured to:

extract a rule-based classification feature value associated with a rule-based classification feature type, determine a target range for the rule-based classification feature type, and determine the rule-based partitioning anomaly detection label for the first predictive input based at least in part on the rule-based classification feature value and the target range for the rule-based classification feature type that is associated with the rule-based classification feature value.

20. The one or more non-transitory computer-readable media of claim 19, wherein:

the first predictive input is associated with an input feature value associated with an input feature type;

the input feature type is associated with a target range;

the randomized partitioning anomaly detection machine learning model is associated with an isolation tree that is generated based at least in part on the input feature type, and the rule-based partitioning anomaly detection model is associated with the rule-based classification feature type.

* * * * *